US012409971B2

(12) United States Patent
Tamaki et al.

(10) Patent No.: US 12,409,971 B2
(45) Date of Patent: Sep. 9, 2025

(54) PACKING MEMBER, TONER CONTAINER, AND PACKING METHOD

(71) Applicants: Shuntaroh Tamaki, Kanagawa (JP); Seiji Terazawa, Shizuoka (JP); Yosio Sano, Shizuoka (JP); Teruo Shibata, Shizuoka (JP); Tatsuya Kubo, Kanagawa (JP)

(72) Inventors: Shuntaroh Tamaki, Kanagawa (JP); Seiji Terazawa, Shizuoka (JP); Yosio Sano, Shizuoka (JP); Teruo Shibata, Shizuoka (JP); Tatsuya Kubo, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 25 days.

(21) Appl. No.: 18/383,904

(22) Filed: Oct. 26, 2023

(65) Prior Publication Data

US 2024/0140642 A1 May 2, 2024

(30) Foreign Application Priority Data

Oct. 31, 2022 (JP) ................................ 2022-174364

(51) Int. Cl.
*B65D 5/50* (2006.01)
*B65B 5/04* (2006.01)
(Continued)

(52) U.S. Cl.
CPC .............. *B65D 5/5016* (2013.01); *B65B 5/04* (2013.01); *B65D 85/68* (2013.01); *G03G 15/0867* (2013.01); *B65D 2585/689* (2013.01)

(58) Field of Classification Search
CPC .................. B65D 5/5016; B65D 85/68; B65D 2585/689; B65D 81/1075; B65B 5/04; G03G 15/0867
(Continued)

(56) References Cited

U.S. PATENT DOCUMENTS 11,623,812 B2 * 4/2023 Itano .................... B65D 81/127 206/591
2011/0073520 A1 * 3/2011 Okuma ................ B65D 81/113 206/590
(Continued)

FOREIGN PATENT DOCUMENTS

JP 2012-121604 A 6/2012
JP 2016-060500 A 4/2016

*Primary Examiner* — Jacob K Ackun
(74) *Attorney, Agent, or Firm* — XSENSUS LLP

(57) ABSTRACT

A packing member, a toner container, and a packing method. The packing member contains the toner container, and the packing member includes a box containing the toner container with a gap between one side of the box and a container body and between the one side of the box and a large-dimension portion of the toner container, a first pressing portion that presses the container body, and a second pressing portion that presses the large-dimension portion. In the packing member, the large-dimension portion of the toner container is disposed at one end of the container body, and the large-dimension portion has a wider dimension than the container body in a direction orthogonal to a longitudinal direction of the toner container. In the packing member, the container body contacts, with first contact force, a first bearer inside the box to maintain the gap.

10 Claims, 5 Drawing Sheets

(51) Int. Cl.
*B65D 85/68* (2006.01)
*G03G 15/08* (2006.01)

(58) Field of Classification Search
USPC ................ 206/320, 576, 521, 591, 592, 594
See application file for complete search history.

(56) References Cited

U.S. PATENT DOCUMENTS

| | | | | |
|---|---|---|---|---|
| 2012/0132559 | A1* | 5/2012 | Okuma .............. | G03G 15/0863 206/524.1 |
| 2012/0144783 | A1 | 6/2012 | Nakamura et al. | |
| 2014/0305838 | A1* | 10/2014 | Kawata .............. | B65D 77/0433 206/784 |
| 2014/0319011 | A1* | 10/2014 | Noguchi .............. | B65D 5/5035 206/521 |
| 2015/0114870 | A1* | 4/2015 | Fujino .................. | B65D 55/024 206/503 |
| 2016/0161885 | A1 | 6/2016 | Hosokawa et al. | |
| 2016/0170369 | A1* | 6/2016 | Toba .................... | G03G 21/181 206/316.1 |
| 2017/0108799 | A1 | 4/2017 | Hosokawa et al. | |
| 2019/0079432 | A1 | 3/2019 | Hosokawa et al. | |
| 2020/0142331 | A1 | 5/2020 | Hosokawa et al. | |
| 2021/0116839 | A1 | 4/2021 | Hosokawa et al. | |
| 2021/0116840 | A1 | 4/2021 | Hosokawa et al. | |
| 2021/0349411 | A1 | 11/2021 | Hosokawa et al. | |
| 2021/0364947 | A1 | 11/2021 | Hosokawa et al. | |
| 2021/0405553 | A1 | 12/2021 | Hosokawa et al. | |
| 2022/0244661 | A1 | 8/2022 | Hosokawa et al. | |
| 2023/0264880 | A1* | 8/2023 | Sakai ................... | B65D 81/025 206/590 |

* cited by examiner

PACKING MEMBER, TONER CONTAINER, AND PACKING METHOD

CROSS-REFERENCE TO RELATED APPLICATION

This patent application is based on and claims priority pursuant to 35 U.S.C. § 119(a) to Japanese Patent Application No. 2022-174364, filed on Oct. 31, 2022, in the Japan Patent Office, the entire disclosure of which is hereby incorporated by reference herein.

BACKGROUND

Technical Field

Embodiments of the present disclosure relate to a packing member, a toner container, and a packing method.

Background Art

Toner containers are known in the art each of which has a long container body and a large-dimension portion at one end of the container body, and the large-dimension portion has a wider dimension than the container body in a direction orthogonal to the longitudinal direction. Moreover, packing members each of which contains the toner container are known in the art.

For example, a toner bottle such as a toner container is known in the art that has the body of a container, which has a long and cylindrical shape, such as a container body and a bottle cap attached to one end of the body of the container in the longitudinal direction, and a packing box such as a packing member that contains the toner bottle is known in the art. Note also that the bottle cap of the toner bottle contained in the packing box has a diameter smaller than that of the body of the container. The packing box is formed as a corrugated cardboard is folded. Moreover, the packing box has four shock-absorbing inner walls that contact the peripheral surface of the body of the toner bottle in four directions. These four shock-absorbing walls do not contact the bottle cap of the toner bottle, and there is a gap between the bottle cap and the packing box.

SUMMARY

Embodiments of the present disclosure described herein provide a packing member, a toner container, and a packing method. The packing member contains the toner container, and the packing member includes a box containing the toner container with a gap between one side of the box and a container body and between the one side of the box and a large-dimension portion of the toner container, a first pressing portion that presses the container body, and a second pressing portion that presses the large-dimension portion. In the packing member, the large-dimension portion of the toner container is disposed at one end of the container body, and the large-dimension portion has a wider dimension than the container body in a direction orthogonal to a longitudinal direction of the toner container. In the packing member, the container body contacts, with first contact force, a first bearer inside the box to maintain the gap between the one side of the box and the container body, and the large-dimension portion contacts, with second contact force whose power is smaller than the first contact force, a second bearer inside the box to maintain the gap between the one side of the box and the large-dimension portion.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
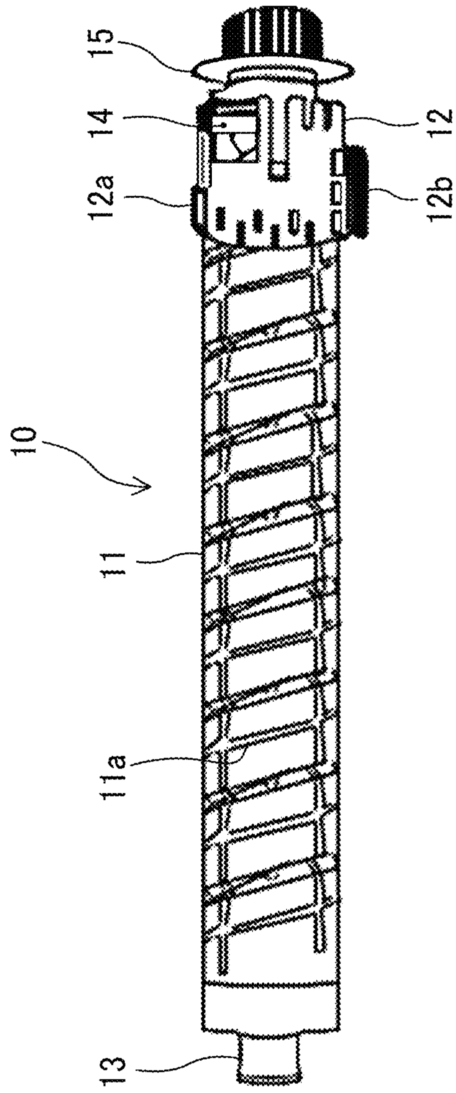
FIG. 1 is a plan view of a toner bottle according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms “a”. “an”, and “the” are intended to include the plural forms as well, unless the context clearly indicates otherwise. It will be further understood that the terms “includes” and/or “including”, when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present disclosure are described below in detail with reference to the drawings.

FIG. is a plan view of a toner bottle 10 that serves as a housing of a toner container, according to an embodiment of the present disclosure.

The toner bottle 10 according to the present embodiment is arranged in a toner bottle container of an image forming apparatus in a detachable manner. The toner bottle 10 that is set in the image forming apparatus is replaced with a new toner bottle when the toner bottle 10 reaches the end of its life. For example, the toner bottle 10 is replaced when almost all the toner in the toner bottle is consumed and the toner bottle becomes empty. The color of the toner that is contained in the toner bottle 10 may be any color.

Typically, the toner bottle 10 according to the present embodiment is composed of a bottle body 11 that is approximately cylindrical and serves as a long container body, and a bottle cap 12 that is approximately cylindrical and serves as a large-dimension portion. The bottle cap 12 according to the present embodiment is arranged at one end of the bottle body 11 in the longitudinal direction, and has a wider external diameter than the bottle body 11 in the radial direction orthogonal to the longitudinal direction.

The toner is contained inside the bottle body 11 of the toner bottle 10. One end of the bottle body 11 in the longitudinal direction has an opening, and the toner that is stored in the bottle body 11 is discharged into the space inside the bottle cap 12 through that opening. At the other end of the bottle body 11 in the longitudinal direction, a grip 13 that is to be held by a user when the toner bottle 10 is attached or detached is arranged.

A helical protrusion 11*a* is arranged on the inner surface of the bottle body 11. Note that the helical protrusion 11*a* appears to be a helical groove when viewed from the outer circumferential surface side. The helical protrusion 11*a* rotates the bottle body 11 in a predetermined direction to discharge the toner from the opening of the bottle body 11 toward the space inside the bottle cap 12. Such a bottle body 11 can be manufactured by blow molding.

The bottle cap 12 according to the present embodiment is provided with, for example, a holder 12*a* used to attach the bottle cap 12 at the opening of the bottle body 11, and a shutter 12*b* that serves as an open-close member. On its side (peripheral surface), the bottle cap 12 is provided with a chip holder that holds an identification (ID) chip 14 that serves as an electronic component. At a position external to the ID chip 14 in the longitudinal direction, a chip protector 15 that protects the ID chip is arranged.

The inside of the bottle cap 12 communicates with the bottle body 11 through the opening of the bottle body 11. The toner that is discharged into the bottle cap 12 through the opening is discharged through a toner outlet arranged on a side face of the bottle cap 12. The toner outlet is closed by a shutter 12*b* when not in use.

When the toner bottle 10 is attached to the image forming apparatus, the bottle cap 12 is held at the bottle housing so as not to rotate the image forming apparatus. When the toner bottle 10 is attached to the image forming apparatus, the shutter 12*b* is opened, and the toner outlet of the bottle cap 12 communicates with the toner inlet of the toner supply device in the image forming apparatus. When the toner bottle 10 is used, the bottle body 11 is driven to rotate, but the bottle cap 12 does not rotate.

A toner container in which the toner bottle 10 is contained in the packing box that serves as a packing member is described below. The toner bottle 10 may be dropped in any direction in the process of distribution. In order to handle such a situation, the toner bottle 10 is accommodated in the packing box 20 that serves as a packing member. By so doing, the product can be protected.

Figure 2:
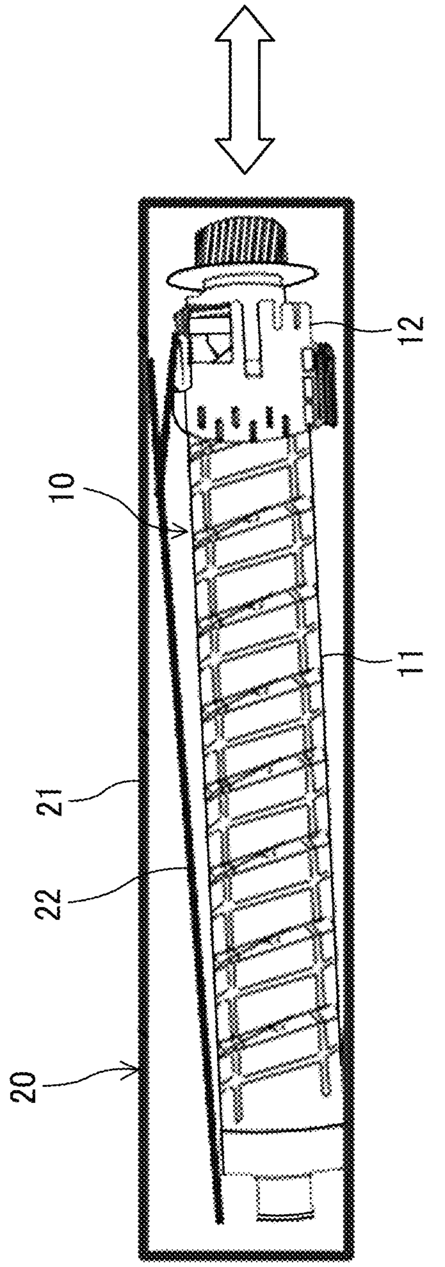
FIG. 2 is a schematic view of a packing box in a lateral direction, where the packing box contains the toner bottle of FIG. 1, according to an embodiment of the present disclosure.

FIG. 2 is a schematic view of the packing box 20 in the horizontal direction, where the packing box contains the toner bottle 10 of FIG. 1 and the packing box 20 is placed in a normal posture in a direction orthogonal to the longitudinal direction, according to the present embodiment. The horizontal direction may be referred to as the lateral direction in the following description.

Figure 3:
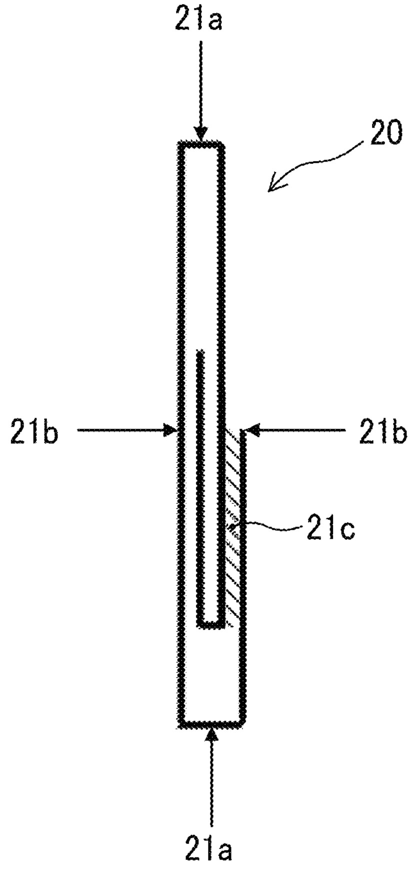
FIG. 3 is a sectional view of the packing box of FIG. 2 in a longitudinal direction, where the packing box is not yet made into a box, according to an embodiment of the present disclosure.

FIG. 3 is a sectional view of the packing box 20 in the longitudinal direction, where the packing box 20 is not yet made into a box, according to the present embodiment.

Figure 4:
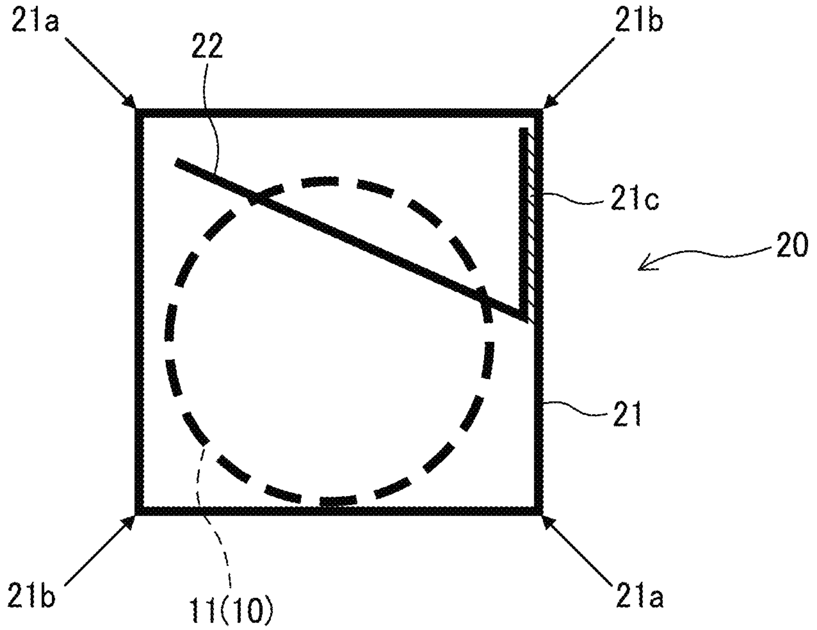
FIG. 4 is a sectional view of the packing box of FIG. 2 in the longitudinal direction, where the packing box has been made into a box, according to an embodiment of the present disclosure.

FIG. 4 is a sectional view of the packing box 20 in the longitudinal direction, where the packing box 20 has been made into a box, according to the present embodiment.

Figure 5:
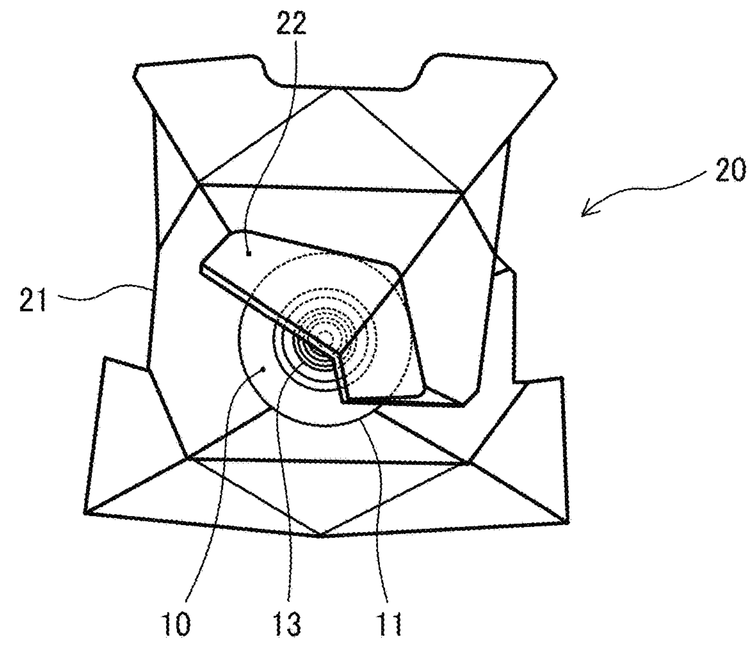
FIG. 5 is a diagram illustrating the inside of a box of the packing box of FIG. 2 viewed from the left in FIG. 2, according to an embodiment of the present disclosure.

FIG. 5 is a diagram illustrating the inside of a box 21 of the packing box 20 viewed from the left in FIG. 2, according to the present embodiment.

The material of the packing box 20 according to the present embodiment is corrugated cardboard. The packing box 20 is made by, for example, cutting a flat corrugated cardboard into pieces and making lines for folding. The material of the packing box 20 is not limited to a corrugated cardboard, but may be any elastic sheet such as a plastic corrugated cardboard, a plastic sheet, or a plastic foam sheet.

As illustrated in FIG. 3, before use, the packing box 20 is flatly folded as the pair of first folding portions 21*a* are folded. When the packing box 20 is to be used, the pair of second folding portions 21*b* are pulled from the state illustrated in FIG. 3 to the right and left in FIG. 3, or the packing box 20 in the state illustrated in FIG. 3 is pushed in the up and down directions in FIG. 3. By so doing, the second folding portion 21*b* is folded, and the packing box 20 is brought into an in-use condition as illustrated in FIG. 4. Due to such a configuration as described above, with a relatively simple configuration or structure, the steps of storing the toner bottle 10 in the packing box 20 can be achieved in a facility where the steps of filling the toner bottle 10 with toner are automated, and the tact time of the steps can be shortened.

Figure 6:
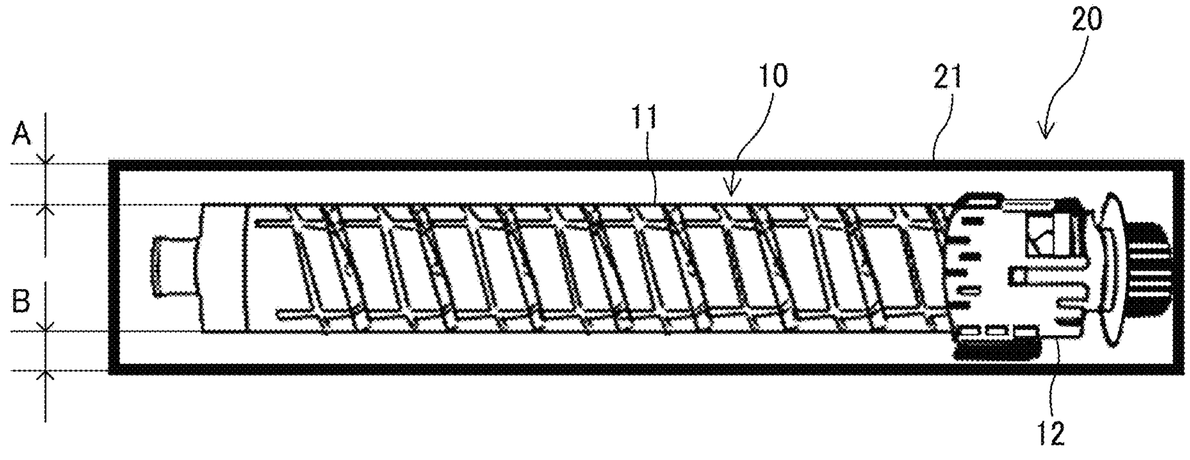
FIG. 6 is a diagram illustrating the gap between a toner bottle and a box, according to an embodiment of the present disclosure.

FIG. 6 is a diagram illustrating the gap between the toner bottle 10 and the box 21, according to the present embodiment.

The packing box 20 in use has the box 21 that contains the toner bottle 10 having a gap with the bottle body 11 and the bottle cap 12 of the toner bottle 10. The gap that is referred to in the present embodiment is the gap between the bottle body 11 and the inner wall of the packing box 20 in the vertical direction and the gap between the bottle cap 12 and the inner wall of the packing box 20 in the vertical direction when the packing box 20 is placed in a normal posture. Due to the formation of such a gap, the toner bottle 10 can smoothly be loaded into or unloaded from the box 21 of the packing box 20. As illustrated in FIG. 6, the maximum value of the gap in the present embodiment is indicated by the pair of gaps A+B between the inner wall of the packing box 20 and the bottle body 11.

As illustrated in FIG. 4, the box 21 according to the present embodiment has a hollow and quadrangularly cylindrical shape whose shape in cross section is approximately square when viewed in the longitudinal direction, and the four sides thereof are formed by the pair of first folding portions 21*a* and the second folding portions 21*b*. The shape in shape in cross section of the box 21 is not limited to a substantially square shape but may be a triangular shape or a polygonal shape.

As described above, at one end of the bottle body 11 in the longitudinal direction, the toner bottle 10 according to the present embodiment is provided with the bottle cap 12 whose outer dimensions are wider than that of the bottle body 11. In the toner bottle 10 of such a configuration, the gap between the inner wall of the box 21 and the bottle body 11 is larger than the gap between the inner wall of the box 21 and the bottle cap 12. Due to such a configuration, when the toner container in which the toner bottle 10 is contained in the packing box 20 is in transit, the bottle body 11 tends to have a wider range of swinging due to the vibration in transit than the bottle cap 12. In the toner bottle 10 of such a configuration, a turning moment in which the bottle body 11 rotates around the bottle cap 12 that contacts the inner wall of the box 21 is easily produced when vibrations are produced in transit. Accordingly, for example, a strong impact tends to be given to the toner stored in the bottle body 11 due to the vibration in transit.

Figure 7:
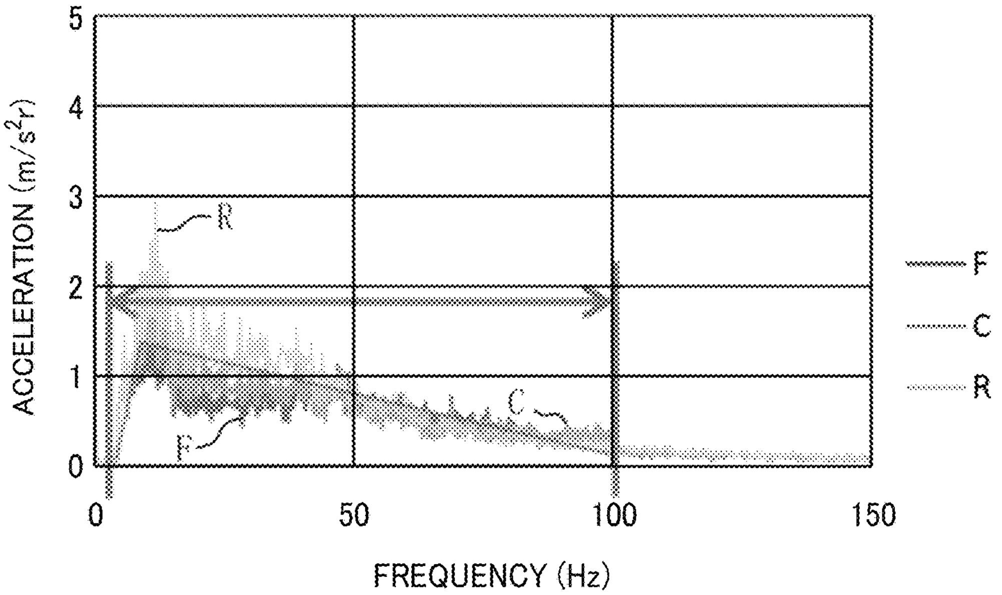
FIG. 7 is a graph illustrating the results of the measurement performed to measure the degree of acceleration (impact), which is caused by the vibration in transit, on the toner bottle packed in a packing box, according to an embodiment of the present disclosure.

FIG. 7 is a graph illustrating the results of the measurement performed to measure the degree of acceleration (impact), which is caused by the vibration in transit, on the toner bottle 10 packed in the packing box 20, according to the present embodiment.

In the graph of FIG. 7, the data F that is measured at a front end of the bottle cap 12 of the toner bottle 10, the data C that is measured at the central portion of the toner bottle 10 in the longitudinal direction, and the data R that is measured at a rear end of the bottle body 11 of the toner bottle 10 are illustrated. As illustrated in the graph of FIG. 7, the degree of the acceleration (or impact) that occurs on the toner bottle 10 is greater at a rear end of the bottle body 11 than at the front end of the bottle cap 12 and the central portion of the bottle cap 12 in the longitudinal direction.

For example, when the impact that is given to the toner stored in the bottle body 11 is strong, the air that is present among the toner particles inside the bottle body 11 easily leaks out, and the toner particles tend to be arranged close to each other. As a result, in particular, when the bottle body 11 is left under high-temperature environments for a long time, toner aggregation easily occurs inside the bottle body 11. When aggregated toner is sent to the toner supply device of the image forming apparatus and is used for an image-forming operation in the image forming apparatus, an abnormal image is produced with a higher probability.

In order to deal with such circumstances as above, it is desired that both the bottle body 11 and the bottle cap 12 of the toner bottle 10 be held so as not to move easily in the box 21. In order to achieve such a configuration or structure, in the present embodiment, both the bottle body 11 and the bottle cap 12 of the toner bottle 10 are held so as not to move easily in the box 21.

More specifically, as illustrated in FIG. 2, the packing box 20 according to the present embodiment includes a first flap 22, which serves as the first pressing portion and presses the bottle body 11, such that the bottle body 11 of the toner bottle 10 contacts the bottom face of the inner wall that serves as the first bearer in the box 21 when the toner bottle 10 is contained in the box 21. In other words, the packing box includes the first flap 22 such that the bottle body 11 contacts the lower inner wall in the vertical direction when the packing box 20 is placed in normal posture. As illustrated in FIG. 2, the first flap 22 is arranged so as to approach the bottle body 11 of the toner bottle 10 in the box 21 from one end (right end in FIG. 2) to the other end (left end in FIG. 2) in the longitudinal direction.

The packing box 20 according to the present embodiment includes a second flap 23 that serves as the second pressing portion and presses the bottle cap 12 such that the bottle cap 12 of the toner bottle 10 contacts the bottom face of the inner wall, which serves as the second bearer in the box 21, when the toner bottle 10 is contained in the box 21. In other words, the packing box 20 according to the present embodiment includes the second flap 23 that presses the bottle cap 12 such that the bottle cap 12 contacts the lower inner wall in the vertical direction when the packing box 20 is placed in normal posture and the toner bottle 10 is contained in the box 21. As illustrated in FIG. 2, the second flap 23 is arranged so as to approach the bottle body 11 of the toner bottle 10 in the box 21 from the other end (left end in FIG. 2) to the one end (right end in FIG. 2) in the longitudinal direction.

Figure 8:
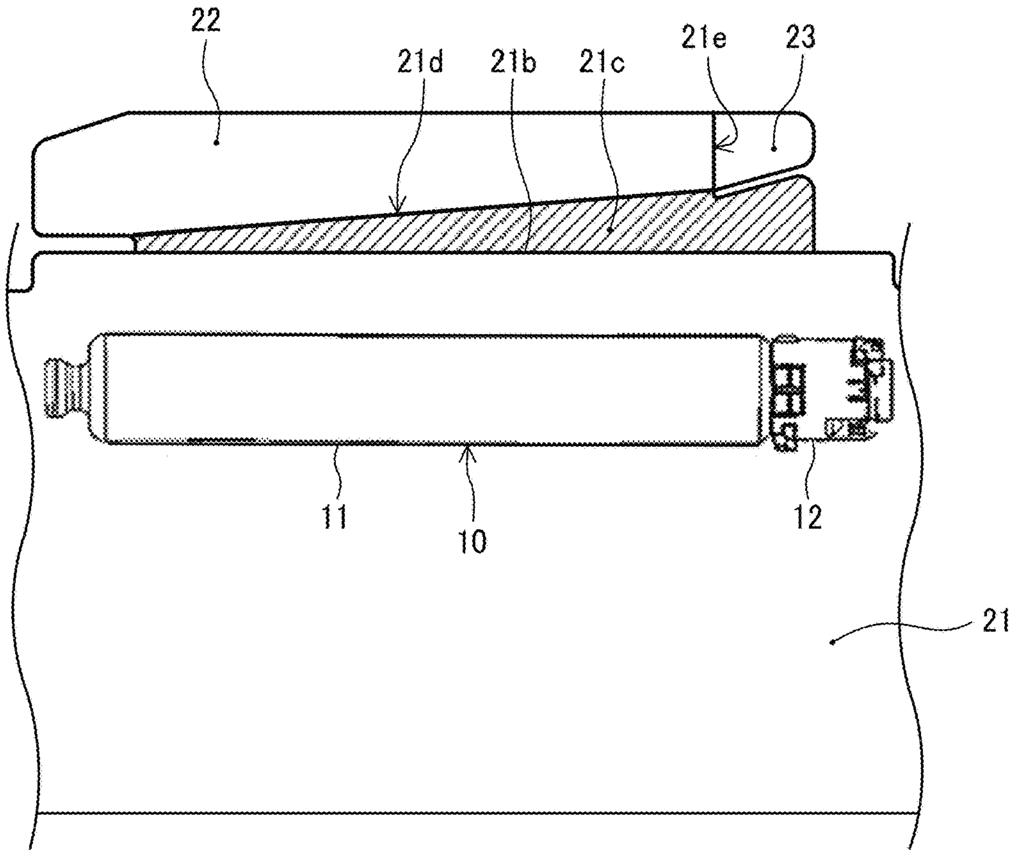
FIG. 8 is a partial development view of a first flap and a second flap of a packing box according to an embodiment of the present disclosure.

FIG. 8 is a partial development view of the first flap 22 and the second flap 23 of the packing box 20 according to the present embodiment.

As illustrated in FIG. 8, the material of the packing box 20 according to the present embodiment is extended in one of the pair of second folding portions 21*b*, or the material of the packing box 20 according to the present embodiment is extended in one of the four sides of the box 21 consisting of the pair of first folding portions 21*a* and the pair of second folding portions 21*b*. The extended portion is classified into the first flap 22, the second flap 23, and an edge for gluing 21*c*.

As a result, the second folding portion 21*b* is folded and bonded to the edge for gluing 21*c* and the inner wall of the box 21, and an end of the first flap 22 in a direction orthogonal to the longitudinal direction is supported by the box 21 (see, for example, FIG. 4).

As illustrated in FIG. 8, the third folding portion 21*d* according to the present embodiment that serves as the boundary between the edge for gluing 21*c* and the first flap 22 in the above-described extended portion is formed to be inclined with respect to the second folding portion 21*b* that makes up one side of the box 21. Due to this inclination, when the edge for gluing 21*c* is bonded to the inner wall of the box 21, as illustrated in FIG. 2, the first flap 22 is arranged so as to approach the bottle body 11 of the toner bottle 10 in the box 21 from one end (right end in FIG. 2) to the other end (left end in FIG. 2) in the longitudinal direction.

In the box 21 according to the present embodiment, the gateway through which the toner bottle 10 is loaded into or unloaded from the box 21 is arranged at one end of the toner bottle 10 in the longitudinal direction near the bottle cap 12 (see the right end in FIG. 2). When the toner bottle 10 is inserted through the gateway of the box 21 in use from the end of the bottle body 11 near the grip 13, the end of the bottle body 11 that has the grip 13 contacts the first flap 22 during the insertion. When the toner bottle 10 is further inserted beyond that state, the bottle body 11 advances while deforming the first flap 22. When the toner bottle 10 is inserted to the very end, the end of the bottle body 11 that has the grip 13 is held between the first flap 22 and the bottom face of the inner wall of the box 21.

As a result, the end of the bottle body 11 that has the grip 13 is pressed by the first flap 22 so as to contact the bottom face of the inner wall of the box 21 with the first contact force. The magnitude of the first contact force can satisfactorily handle the weight of the bottle body 11 filled with the toner, and can prevent the bottle body 11 from moving away from the bottom face of the inner wall of the box 21 despite the vibration in transit. Accordingly, the bottle body 11 does not swing inside the box 21.

In the present embodiment, in particular, the first flap 22 presses the bottle body 11 from above in the vertical direction when the packing box 20 is placed in normal posture. Due to such a configuration, the self-weight of the bottle body 11 whose weight is relatively heavy as filled with toner also acts, and it is unlikely that the bottle body 11 moves away from the bottom face of the inner wall of the box 21. Accordingly, the swinging of the bottle body 11 inside the box 21 due to the vibration during transport can further be prevented.

Once the toner bottle 10 is inserted to the very end inside the box 21, the fourth folding portion 21*e* that serves as the boundary between the first flap 22 and the second flap 23 in the above-described extended portion is folded. Due to such a configuration, as illustrated in FIG. 2, the second flap 23 contacts and presses the bottle cap 12 of the toner bottle 10. The bottle cap 12 that is pressed by the second flap 23 contacts the bottom face of the inner wall of the box 21 with the second contact force.

The magnitude of the second contact force is smaller than the first contact force when the bottle body 11 contacts the bottom face of the inner wall of the box 21 by the pressing force of the first flap 22, but is considered to be sufficient in the present embodiment. In other words, the bottle cap 12 is lighter than the bottle body 11 that is filled with toner. Accordingly, the second contact force that is used to make the bottle cap 12 contact the bottom face of the inner wall of the box 21 does not have to be as much as the first contact force in the case of the bottle body 11 in order to prevent the bottle cap 12 from swinging due to the vibration during transport. Accordingly, even with the configuration or structure of the second flap 23 as in the present embodiment, a sufficient degree of second contact force to prevent the bottle cap 12 from swinging due to the vibration during transport can be achieved.

The second flap 23 may be pressed with a sufficiently strong pressing force equivalent to the pressing force of the first flap 22. However, it is difficult to achieve this with a relatively simple configuration in limited space such as the space inside the box 21. Accordingly, with the present embodiment, both the bottle body 11 and the bottle cap 12 of the toner bottle 10 can be held so as not to move easily in the box 21 with a relatively simple configuration.

In the packing box 20 according to the present embodiment, the second flap 23 that is to press the bottle cap 12 does not press the ID chip 14 arranged on the side face or peripheral surface of the bottle cap 12. More specifically, as illustrated in FIG. 2, the length of the second flap 23 in the longitudinal direction is designed such that the position of the end of the second flap 23 in the longitudinal direction does not reach the position of the ID chip 14 in the longitudinal direction in the toner bottle 10 stored in the box 21. Due to such a configuration, the ID chip 14 can be prevented from being subjected to the impact due to the vibration in transit through the second flap 23, and for example, the damage on the ID chip 14 in transit can be prevented.

Figure 9:
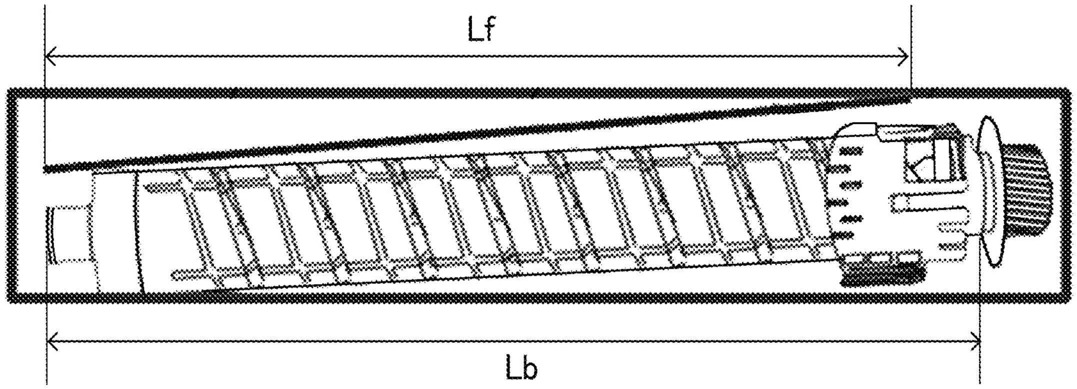
FIG. 9 is a diagram illustrating the length of the first flap of FIG. 8 in the longitudinal direction, according to an embodiment of the present disclosure.

FIG. 9 is a diagram illustrating the length Lf of the first flap 22 of FIG. 8 in the longitudinal direction, according to the present embodiment.

In the present embodiment, as illustrated in FIG. 9, it is desired that the length Lf of the first flap 22 in the longitudinal direction be equal to or larger than ninety percent of the length Lb of the toner bottle 10 in the longitudinal direction. Due to such a configuration, greater pressing force can easily be achieved, and the bottle body 11 whose weight is relatively heavy as it is filled with toner can effectively be prevented from swinging.

Figure 10:
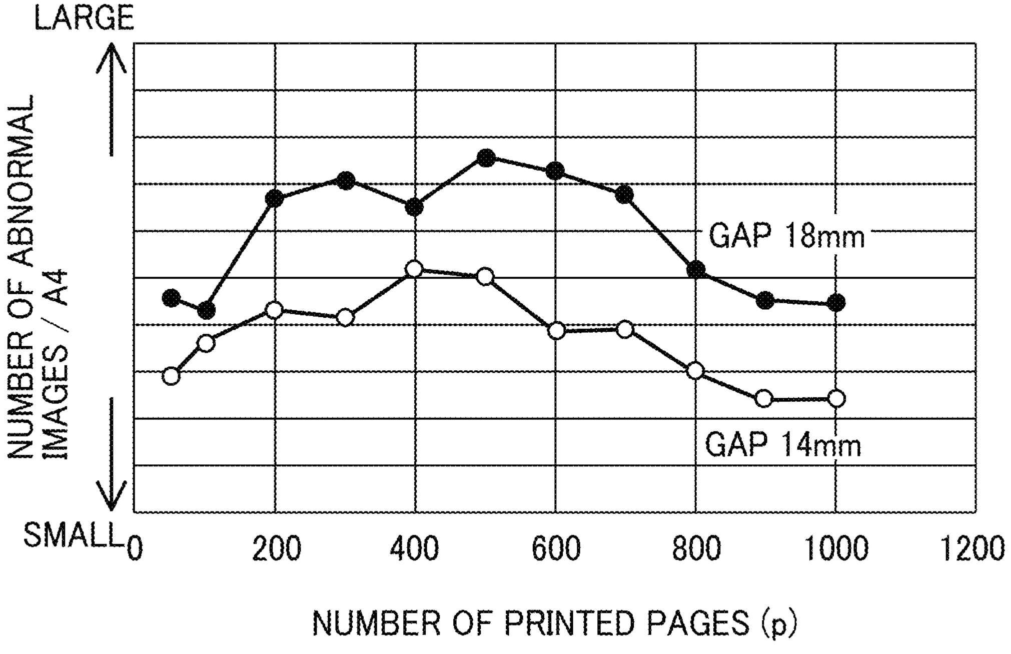
FIG. 10 is a graph illustrating the results of the measurement performed to measure the number of abnormal images that appeared on the images formed using a toner bottle in an image forming apparatus after the toner bottle packed in a packing box is vibrated, according to an embodiment of the present disclosure.

FIG. 10 is a graph illustrating the results of the measurement performed to measure the number of abnormal images that appeared on the images formed using the toner bottle 10 in the image forming apparatus after the toner bottle 10 packed in the packing box 20 is vibrated, according to the present embodiment.

In the graph of FIG. 10, the results of a pair of measurements are illustrated, where the number of abnormal images when the maximum value of the gap between the toner bottle 10 and the inner wall of the box 21 in the packing box 20 is 18 mm is measured in one measurement and the number of abnormal images when the maximum value of the gap is 14 mm is measured in the other measurement. In the present embodiment, such a gap indicates the pair of gaps A+B between the bottle body 11 of the toner bottle 10 and the pair of upper and lower inner walls of the box 21 in FIG. 10. In those measurements, the number of the abnormal images that are caused by the aggregated toner and look like shooting stars and the number of abnormal images that are caused by the aggregated toner and look like black spots are counted. As a result of the measurements, it can be evaluated that a larger number of abnormal images correlates with a larger amount of toner aggregation in the toner bottle 10.

As illustrated in the graph of FIG. 10, the number of abnormal images is greater when the maximum value of the gap is 14 mm than when the maximum value of the gap is 18 mm. Accordingly, it is desired in the packing box 20 according to the present embodiment that the maximum value of the gap be equal to or smaller than 14 mm.

The embodiments described above are given as an example, and unique advantageous effects are achieved for each of the following aspects given below.

First Aspect

According to the first aspect of the present disclosure, a packing member such as the packing box 20 contains a toner container such as the toner bottle 10, and the toner container includes a long container body such as the bottle body 11 and a large-dimension portion such as the bottle cap 12 at one end of the container body. The large-dimension portion has a wider dimension such as a wider external diameter than the container body in a direction orthogonal to a longitudinal direction. The packing member further includes: the box 21 containing the toner container with a gap between the container body and the large dimension portion; a first pressing portion such as the first flap 22 that presses the container body such that the container body contacts, with the first contact force, the first bearer inside the box, such as the bottom face of the inner wall of the box 21; and a second pressing portion such as the second flap 23 that presses the large-dimension portion such that the large-dimension portion contacts, with the second contact force whose power is smaller than the first contact force, the second bearer inside the box, such as the bottom face of the inner wall of the box 21.

When the toner container has the large-dimension portion at one end of the container body and the large-dimension portion has a wider dimension than the container body in a direction orthogonal to the longitudinal direction, the gap between the box and the container body is wider than the gap between the box and the large-dimension portion. Due to such a configuration, the container body tends to have a wider range of swinging due to the vibration in transit than the large-dimension portion. Moreover, a turning moment in which the container body rotates around the large-dimension portion that contacts the inner wall of the box is easily produced when vibrations are produced in transit. Accordingly, for example, a strong impact tends to be given to the toner stored in the container body due to the vibration in transit, and the air present among the toner particles easily leaks out. As a result, the toner particles tend to be arranged close to each other. In particular, when the container body is left under high-temperature environments for a long time, toner aggregation occurs easily, and abnormal images are produced with a higher probability due to the aggregated toner.

In order to deal with such circumstances as above, it is desired that not only the container body but also the large-dimension portion of the toner container be kept so as not to move easily inside the box. This is because, in a configuration or structure where the large-dimension portion easily moves inside the box, the degree of swinging of the large-dimension portion may be amplified due to the vibration in transit, and the amplified degree of swinging of the large-dimension portion may be conveyed to the held container body. In such a configuration or structure, the container body may swing strongly or widely. In order to handle such a situation, the first pressing portion and the second pressing portion are arranged in the present aspect. The first pressing portion presses the container body such that the container body of the toner container contacts the first bearer of the box, and the second pressing portion presses the large-dimension portion such that the large-dimension portion of the toner container contacts the second bearer of the box.

As the container body stores the toner, the container body has a heavier weight than the large-dimension portion. Due to such a configuration, in order to prevent the swinging of the container body due to the vibration in transit, the container body has to contact the first bearer of the box with a relatively strong contact force. i.e., the first contact force, and it is desired that the container body be pressed against the first pressing portion with a sufficiently-strong pressing force. In so doing, pressing the second pressing portion with a sufficiently strong pressing force equivalent to the pressing force of the first flap 22 cannot easily be achieved with a simple configuration in limited space such as the inside of the box. By contrast, the large-dimension portion has a lighter weight than the container body, and thus the second contact force that is used to make the large-dimension portion contact the second bearer of the box does not have to be as strong as the first contact force used to make the container body contact the first bearer of the box.

In view of these circumstances, in the present aspect, the first contact force of the container body by the pressing force of the first pressing portion is increased to be greater than the second contact force of the large-dimension portion by the pressing force of the second pressing portion.

Due to such a configuration, even in limited space such as the inside of the box, with a relatively simple configuration, the large-dimension portion can be pressed by the second pressing portion with the second contact force whose degree is sufficiently large while sufficiently increasing the first contact force of the container body by the pressing force of the first pressing portion. Accordingly, with a relatively simple configuration, the toner aggregation inside the toner container due to the vibration in transit can be prevented.

Second Aspect

In the packing member according to the first aspect of the present disclosure, when the packing member is disposed in a normal posture the first pressing portion and the second pressing portion press the container body and the large-dimension portion from above in the vertical direction.

Due to such a configuration, the container body and the large-dimension portion contact the first bearer and the second bearer by the weight of the container body and the large-dimension portion. Accordingly, the swinging of the container body and the large-dimension portion inside the box due to the vibration in transit can further be prevented.

Third Aspect

In the packing member according to the first aspect or the second aspect of the present disclosure, the gap has a maximum value equal to or smaller than 14 millimeters (mm). Due to such a configuration, the toner aggregation inside the toner container due to the vibration in transit can further be prevented.

Fourth Aspect

In the packing member according to any one of the first aspect to the third aspect, the first pressing portion or the second pressing portion does not press an electronic component such as the ID chip 14 provided for the toner container.

With the packing member according to the fourth aspect of the present disclosure, the electronic component can be prevented from being subjected to the impact due to the vibration in transit through the first pressing portion or the second pressing portion, and for example, the damage on the electronic component in transit can be prevented.

Fifth Aspect

In the packing member according to any one of the first aspect to the fourth aspect, the first pressing portion is supported by the box at an end in a direction orthogonal to the longitudinal direction, and approaches the container body of the toner container from one end to another end in the longitudinal direction. Moreover, the first pressing portion has a length equal to or greater than ninety percent of length of the toner container in the longitudinal direction.

Due to such a configuration, greater pressing force of the first pressing portion can easily be achieved, and the container body whose weight is relatively heavy as filled with toner can effectively be prevented from swinging.

Sixth Aspect

In the packing member according to any one of the first aspect to the fifth aspect, at least one of the first pressing portion and the second pressing portion is integrated with the box.

With the packing member according to the sixth aspect of the present disclosure, the first pressing portion or the second pressing portion can be integrally produced with the box, and the first pressing portion and the second pressing portion can be produced at lower cost. As the precision of the relative positions of the first pressing portion or the second pressing portion to the box can be enhanced, a desired degree of contact force can be obtained.

Seventh Aspect

In the packing member according to any one of the first aspect to the sixth aspect, the box has a gateway at one end of the large-dimension portion of the toner container in the longitudinal direction, and the toner container is loaded or unloaded through the gateway of the box.

With the packing member according to the seventh aspect of the present disclosure, the toner container can easily be inserted into the box 21 provided with the first pressing portion.

Eighth Aspect

In the packing member according to the seventh aspect of the present disclosure, the first pressing portion approaches the container body of the toner container from one end to another end in the longitudinal direction, and the second pressing portion approaches the large-dimension portion of the toner container from the another end to the one end in the longitudinal direction.

With the packing member according to the seventh aspect of the present disclosure, the toner container does not get caught by the first pressing portion or the second pressing portion when the toner container is unloaded from the gateway, and the toner container can easily be taken out.

Ninth Aspect

A toner container according to the ninth aspect includes: a toner-container housing such as the toner bottle 10 including a long container body such as the bottle body 11 and a large-dimension portion such as the bottle cap 12 at one end of the container body, the large-dimension portion having a wider dimension such as a wider external diameter than the container body in a direction orthogonal to a longitudinal direction; and a packing member such as the packing box 20 containing the toner-container housing. The packing member according to the ninth aspect of the present disclosure is the packing member according to any one of the first aspect to the sixth aspect of the present disclosure.

With the toner container according to the ninth aspect of the present disclosure, with a relatively simple configuration, the toner aggregation inside the toner container due to the vibration in transit can be prevented in the toner container where the toner-container housing is contained in the packing member.

Tenth Aspect

A method of packing a toner container such as the toner bottle 10 using a packing member such as the packing box 20, the method comprising: containing the toner container in the box 21 of the packing member, with a gap between the container body and the large-dimension portion, the toner container including a long container body such as the bottle body 11 and a large-dimension portion such as the bottle cap 12 at one end of the container body, the large-dimension portion having a wider dimension such as a wider external diameter than the container body in a direction orthogonal to a longitudinal direction; pressing the container body using the first pressing portion such as the first flap 22 of the packing member, such that the container body contacts, with the first contact force, the first bearer inside the box, such as the bottom face of the inner wall of the box 21; and pressing the large-dimension portion using the second pressing portion such as the second flap 23 of the packing member such as the packing box 20, such that the large-dimension portion contacts, with the second contact force whose power is smaller than the first contact force, the second bearer inside the box, such as the bottom face of the inner wall of the box 21.

With the method of packing the toner container according to the tenth aspect of the present disclosure, the toner aggregation inside the toner container due to the vibration in transit can be prevented with a relatively simple configuration.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. A packing member containing a toner container, the packing member comprising:

a box containing the toner container with a gap between one side of the box and a container body and between the one side of the box and a large-dimension portion of the toner container, the large-dimension portion of the toner container being disposed at one end of the container body, the large-dimension portion having a wider dimension than the container body in a direction orthogonal to a longitudinal direction of the toner container, a first pressing portion that presses the container body, the container body contacting, with first contact force, a first bearer inside the box; and a second pressing portion that presses the large-dimension portion, the large-dimension portion contacting, with second contact force whose power is smaller than the first contact force, a second bearer inside the box.

2. The packing member according to claim 1, wherein, when the packing member is disposed in a normal posture, the first pressing portion and the second pressing portion press the container body and the large-dimension portion from above in a vertical direction.

3. The packing member according to claim 1, wherein the gap has a maximum value equal to or smaller than 14 millimeters.

4. The packing member according to claim 1, wherein at least one of the first pressing portion or the second pressing portion does not press an electronic component disposed on the toner container.

5. The packing member according to claim 1, wherein the first pressing portion is supported by the box at an end in the direction orthogonal to the longitudinal direction of the toner container, wherein the first pressing portion approaches the container body of the toner container from one end to another end in the longitudinal direction, and wherein the first pressing portion has a length equal to or greater than ninety percent of length of the toner container in the longitudinal direction.

6. The packing member according to claim 1, wherein at least one of the first pressing portion and the second pressing portion is integrated with the box.

7. The packing member according to claim 1, wherein the box has a gateway at one end of the large-dimension portion of the toner container in the longitudinal direction of the toner container, and wherein the toner container is loaded or unloaded through the gateway of the box.

8. The packing member according to claim 7, wherein the first pressing portion approaches the container body of the toner container from one end to another end in the longitudinal direction of the toner container, and wherein the second pressing portion approaches the large-dimension portion of the toner container from the another end to the one end in the longitudinal direction.

9. A toner container comprising:

a housing including a container body and a large-dimension portion, the large-dimension portion being disposed at one end of the container body, the large-dimension portion having a wider dimension than the container body in a direction orthogonal to a longitudinal direction of the toner container; and the packing member according to claim 1, containing the housing.

10. A method of packing a toner container using a packing member, the method comprising:

containing the toner container in a box of the packing member, with a gap between one side of the box and a container body and between the one side of the box and a large-dimension portion of the toner container, the large-dimension portion being disposed at one end of the container body, the large-dimension portion having a wider dimension than the container body in a direction orthogonal to a longitudinal direction of the toner container;

pressing the container body using a first pressing portion of the packing member, the container body contacting, with first contact force, a first bearer inside the box; and pressing the large-dimension portion using a second pressing portion of the packing member, the large-dimension portion contacting, with second contact force whose power is smaller than the first contact force, a second bearer inside the box.

* * * * *